US009291836B2

(12) United States Patent
Kim et al.

(10) Patent No.: US 9,291,836 B2
(45) Date of Patent: Mar. 22, 2016

(54) OPTICAL MODULATOR AND OPTICAL MODULE INCLUDING THE SAME

(71) Applicant: Electronics and Telecommunications Research Institute, Daejeon (KR)

(72) Inventors: Jin Tae Kim, Daejeon (KR); Kwang Hyo Chung, Daejeon (KR); Young-Jun Yu, Daejeon (KR); Choon Gi Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 25 days.

(21) Appl. No.: 14/184,107

(22) Filed: Feb. 19, 2014

(65) Prior Publication Data

US 2014/0341496 A1    Nov. 20, 2014

(30) Foreign Application Priority Data

May 15, 2013    (KR) .......................... 10-2013-0055214

(51) Int. Cl.
*G02B 6/00*    (2006.01)
*G02F 1/01*    (2006.01)

(52) U.S. Cl.
CPC .............. *G02F 1/0147* (2013.01); *G02F 1/011* (2013.01); *G02F 2203/10* (2013.01); *Y10T 29/49002* (2015.01)

(58) Field of Classification Search
CPC .................................... G02B 6/00; G02B 6/01
USPC ............................................................ 385/1
See application file for complete search history.

(56) References Cited

U.S. PATENT DOCUMENTS

| 6,741,782 | B2 | 5/2004 | Berini | |
| 6,902,871 | B2 | 6/2005 | Dinu et al. | |
| 7,294,292 | B2 | 11/2007 | Akutsu et al. | |
| 8,406,578 | B2 | 3/2013 | Oikawa et al. | |
| 8,554,022 | B1* | 10/2013 | Hochberg et al. | 385/1 |
| 2012/0146743 | A1* | 6/2012 | Ermolov | 333/161 |
| 2013/0105795 | A1* | 5/2013 | Kim et al. | 257/49 |
| 2014/0023321 | A1* | 1/2014 | Lu et al. | 385/40 |
| 2014/0056551 | A1* | 2/2014 | Liu et al. | 385/2 |
| 2014/0105553 | A1* | 4/2014 | Kim et al. | 385/123 |

OTHER PUBLICATIONS

Y.O. Noh et al., "PLC-type variable optical attenuator operated at low electrical power" Electronics Letters, vol. 36, No. 24, pp. 2032-2033, Nov. 2000.

* cited by examiner

*Primary Examiner* — Kaveh C Kianni
(74) *Attorney, Agent, or Firm* — Rabin & Berdo, P.C.

(57) ABSTRACT

Provided are an optical modulator modulating optical signals and an optical module including the same. The optical modulator includes a lower clad layer, an optical transmission line extended in a first direction on the lower clad layer, and an upper clad layer on the optical transmission line and the lower clad layer. The optical transmission line may include graphene.

6 Claims, 10 Drawing Sheets

OPTICAL MODULATOR AND OPTICAL MODULE INCLUDING THE SAME

CROSS-REFERENCE TO RELATED APPLICATIONS

This U.S. non-provisional patent application claims priority under 35 U.S.C. §119 of Korean Patent Application No. 10-2013-0055214, filed on May 15, 2013, the entire contents of which are hereby incorporated by reference.

BACKGROUND OF THE INVENTION

The present invention disclosed herein relates to an optical apparatus and, more particularly, to an optical modulator modulating optical signals and an optical module including the same.

Recently, optical communication techniques on the basis of the IT technologies are rapidly evolved. The optical communication techniques may be largely divided into transmission, reception and modulation fields. Among them, the modulation field may have close relationship with high frequency characteristics and processing speed of optical signals. A typical optical modulator may include a Mach-Zehnder modulator and a thermo-optic modulator.

The Mach-Zehnder may include an input waveguide, an output waveguide, and a plurality of branch waveguides between the input and output waveguides. The branch waveguides may be branched into both sides from a rear end of the input waveguide. An optical signal from the input waveguide may be divided into optical signals having half intensity at the branch waveguides. The branch waveguides may include a ridge type silicon waveguide. Any one of the branch waveguides may have a refractive index adjusted by an external signal. Any one of the branch waveguides may retard a phase of the optical signal of half intensity or transfer the optical signal without phase retardation. The other branch waveguide may transfer the optical signal of half intensity without phase retardation. The branch waveguides may be connected at a front end of the output waveguide. The half intensity optical signals may be modulated by constructive interference or destructive interference between the branch waveguides and the output waveguide. When refractive indexes of the branch waveguides are the same, an optical signal input to the input waveguide may be output from the output waveguide without change. The optical signal may include data corresponding to value 1. On the contrary, the refractive indexes of the branch waveguides are different from each other, the half intensity optical signals may be destructed and output from the output waveguide. The output optical signal may include data corresponding to value 0. Accordingly, the output waveguide may output a modulated optical signal. However, the Mach-Zehnder modulator has a complex structure including the input waveguide, the branch waveguides, and the output waveguide.

The thermo-optic modulator may include a multi-mode optical fiber and a heater on the multi-mode optical fiber. Single-mode optical fibers may be connected to both ends of the multi-mode optical fiber. The signal mode and multi-mode optical fibers may be extended in one direction. The heater may be disposed in a crossing direction with the multi-mode optical fiber. The multi-mode optical fiber may have a refractive index changing along with heating by the heater. An optical signal may be modulated according to the refractive index of the multi-mode optical fiber. The multi-mode optical fiber may be manufactured in an emboss structure having a 3-dimensional size. However, the emboss structured multi-mode optical fiber may be manufactured with expensive etching equipment in a high-cost semiconductor process. Thus, a typical thermo-optic modulator has low productivity.

SUMMARY OF THE INVENTION

The present invention provides an optical modulator including an optical transmission line having a graphene layer and an optical module including the same.

The present invention also provides an optical modulator having a simple structure and an optical module including the same.

Embodiments of the inventive concept provide optical modulators including: a lower clad layer; an optical transmission line extending in a first direction on the lower clad layer; and an upper clad layer on the optical transmission line and the lower clad layer, wherein the optical transmission line comprises graphene.

In some embodiments, the optical transmission line may include an input region, a modulation region, and an output region with respect to the first direction, wherein the modulation region of the optical transmission line is disposed between the input region and the output region, and extended wider than the input and output regions in a second direction crossing the first direction.

In other embodiments, the modulation region may include: a guide region disposed between the input and output regions and having the same linewidth as those of the input and output regions; and a pad region connected to both sides of the guide region in the second direction.

In still other embodiments, the optical modulator may further include pad electrodes connected to top portions or bottom portions of the pad regions.

In even other embodiments, the optical modulator may further include signal interconnections connected to the pad electrodes.

In yet other embodiments, the signal interconnections may include: an interconnection layer disposed on the upper clad layer or beneath the lower clad layer; and a contact layer penetrating through the upper or lower clad layer, and connected to the upper clad layer and the pad electrodes, or the lower clad layer and the pad electrodes.

In further embodiments, the optical modulator may further include optical fibers connected to the optical transmission line of the input and output regions.

In still further embodiments, the lower and upper clad layers may include dielectrics.

In even further embodiments, the dielectrics may include a silicon oxide film or silicon nitride film.

In yet further embodiments, the graphene may have a single layer.

In other embodiments of the inventive concept, optical modules include: a substrate; a light source disposed on one side of the substrate; and an optical modulator comprises a lower clad layer disposed on another side, which is opposite to the light source, on the substrate, an optical transmission line extending in a first direction on the lower clad layer, and an upper clad layer on the optical transmission line and the lower clad layer, wherein the optical transmission line comprises graphene.

In some embodiments, the light source may be a laser.

In other embodiments, the laser may include an external resonator laser.

In still other embodiments, the external resonator laser may include: an oscillator disposed adjacent to the optical modulator and generating a laser light; and an external resonator disposed another side of the oscillator, which is opposite to the optical modulator, and the external resonator resonating the laser light.

In even other embodiments, the oscillator may include: a buffer layer on the substrate; a lower electrode layer on the buffer layer; a semiconductor layer disposed on the lower electrode layer and connected to the optical transmission line of the optical modulator; and an upper electrode layer on the semiconductor layer.

In yet other embodiments, the external resonator may include: a lower insulating layer of the substrate; a grating layer disposed on the lower insulating layer and having the same level as those of the optical transmission line and the semiconductor layers; and an upper insulating layer on the grating layer.

In further embodiments, the laser may include a vertical-cavity surface-emitting laser (VCSEL).

In still further embodiments, the VCSEL may include: first mirror layers connected to the optical modulator and having a first superlattice structure; an activation layer connected to the first mirror layers and oscillating a laser light; and second mirror layers having a second superlattice structure connected to the activation layer and reflecting the laser light.

In still other embodiments of the inventive concept, methods of fabricating an optical modulator, includes: forming an optical transmission line of graphene on a lower clad layer; forming pad electrodes on a pad region of the optical transmission line; forming an upper lad layer on the pad electrodes and the optical transmission line; removing the upper clad layer on the pad electrodes and forming contact holes; and forming signal interconnections inside the contact holes and on the upper clad layer.

In some embodiments, the forming of the optical transmission line may include: forming the graphene on the lower clad layer in a chemical vapor deposition; and patterning the graphene in photolithography.

BRIEF DESCRIPTION OF THE DRAWINGS

The accompanying drawings are included to provide a further understanding of the present invention, and are incorporated in and constitute a part of this specification. The drawings illustrate exemplary embodiments of the inventive concept and, together with the description, serve to explain principles of the present invention. In the drawings.

DETAILED DESCRIPTION OF PREFERRED EMBODIMENTS

Preferred embodiments of the inventive concept will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the inventive concept in conjunction with the accompanying drawings. In the drawings, parts which are not related to the description are omitted to clearly set forth the present invention and similar elements are denoted by similar reference symbols throughout the specification.

It will be further understood that throughout this specification and claims, when an element is referred to as "including" or "comprising" a component, it does not preclude another component but may further include the other component unless the context clearly indicates otherwise.

It will be understood that when an element such as a layer, film, region or substrate is referred to as being "on" another element, it can be directly on the other element or intervening elements may also be present. In contrast, when an element is referred to as being "directly on" another element, there are no intervening elements present.

Figure 1:
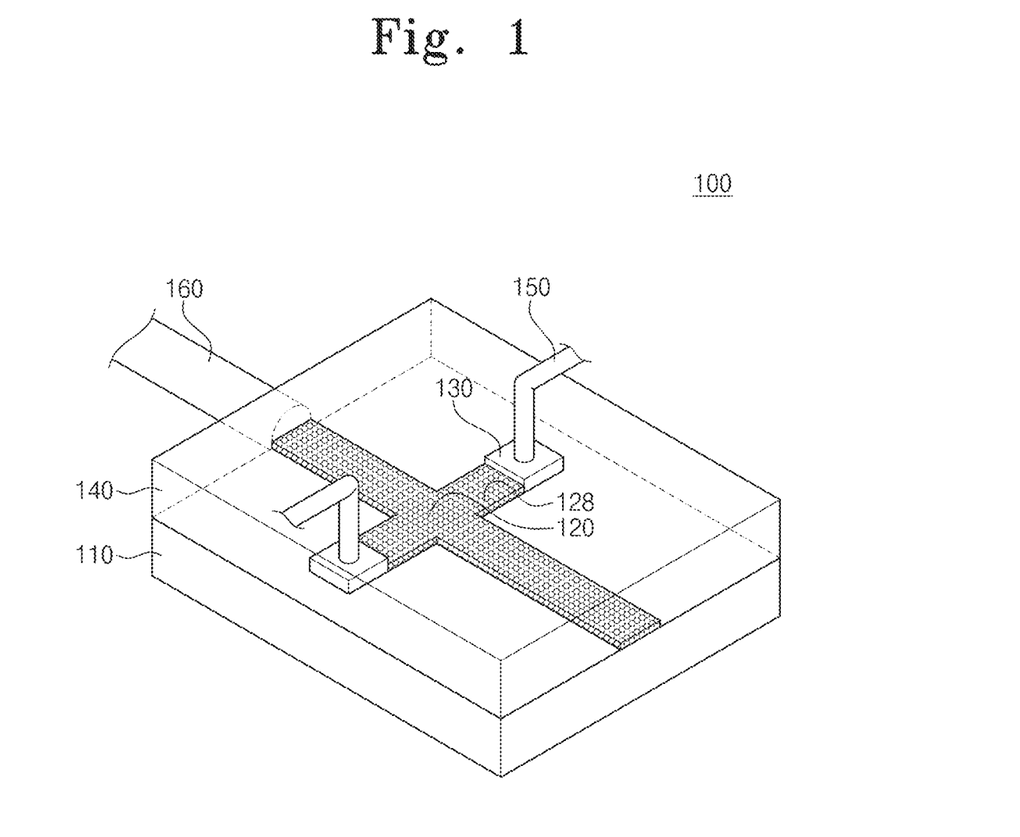
FIG. 1 is a perspective view illustrating a graphene optical modulator 100 according to an embodiment of the inventive concept.
Figure 2:
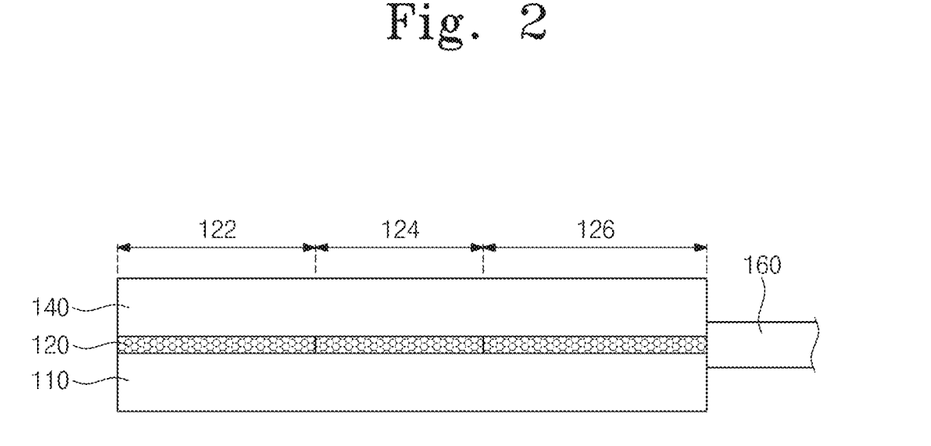
FIGS. 2 and 3 are cross-sectional views of FIG. 1.
Figure 3:
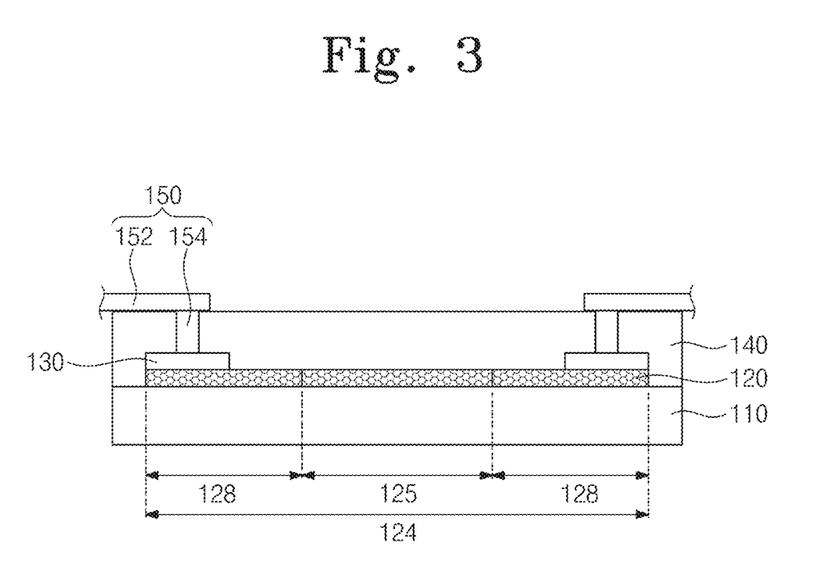

FIG. 1 is a perspective view illustrating a graphene optical modulator 100 according to an embodiment of the inventive concept. FIGS. 2 and 3 are cross-sectional views of FIG. 1

Referring to FIGS. 1 to 3, the graphene optical modulator 100 according to the embodiment of the inventive concept includes a lower clad layer 110, a graphene optical transmission line 120, pad electrodes 130, an upper clad layer 140, and signal interconnections 150.

The lower clad layer 110 may include a dielectric such as a silicon oxide film or a silicon nitride film. The optical transmission line 120 may be extended on the lower clad layer 110 in a first direction. The upper clad layer 140 covers the lower clad layer 110, the optical transmission line 120, and the pad electrodes 130. The upper clad layer 140 may include a silicon oxide film or a silicon nitride film.

The optical transmission line 120 may be divided into an input region 122, a modulation region 124, and an output region 126 with respect to the first direction. The input region 122 and the output region 126 may be connected to an optical fiber 160. The optical fiber 160 may be connected side walls of the lower and upper clad layers 110 and 150 in the first direction. The optical transmission line 120 may be connected to the optical fiber 160. The optical fiber 160 may provide an optical signal of an incident light. The optical signal is modulated in the modulation region 124. The modulation region 124 may be disposed between the input and output regions 122 and 126. The input and output regions 122 and 126 may be narrower than the modulation region 124. The modulation region 124 may include a guide region 125 and pad regions 128. The guide region 125 may have the same linewidth as those of the input and output regions 122 and 126. The pad regions 128 may be disposed at both sides of the guide region 125. The guide region 125 is a region where an optical signal is modulated and propagating between the input and output regions 122 and 126. The pad regions 128 are extended regions of the optical transmission line 120 which is wider than the input and output regions 122 and 126 in a second direction, The pad electrodes 130 may be disposed on the optical transmission line 120 of the pad regions 128. The pad electrodes 130 may include a metal such as gold, silver, copper, aluminum, tungsten, nickel, chromium, molybdenum, tantalum, or titanium.

The signal interconnections 150 may be connected to the pad electrodes 130. The pad electrodes 130 may be disposed between the lower and upper clad layers 110 and 140. The signal interconnections 150 may penetrate through the upper clad layer 140 to be connected to the pad electrodes 130. The signal interconnections 150 may include a metal interconnection layer 152 and a contact layer 154. The metal interconnection layer 152 may be extended in the second direction on the upper clad layer 140. The contact layer 154 may connect the metal interconnection layer 152 and the electrode pads 130. The contact layer 154 may penetrate through the upper clad layer 140. The present invention is not limited hereto and various changes in the embodiment are possible. Although not drawn in the drawing, the signal interconnections 150 may penetrate through the lower clad layer 110 and be connected to the pad electrodes 130. The signal interconnections 150 may transfer a pulse signal to the pad regions 128 of the optical transmission lines 120.

Furthermore, the optical transmission line 120 may include a single layer graphene. The graphene is a material having a thin plane structure of a hive shape where carbon atoms are interconnected and has electrical property. The carbon atoms are interconnected to form a signal carbon atom layer. The graphene may include a single carbon atom layer or multiple carbon atom layers. At this time, the signal layered graphene layer 140 has the same thickness as that of a single carbon atom. The carbon atoms have a six-membered ring as a basic unit, and may be formed in a five-membered ring or seven-membered ring. The graphene may be formed in a transferring method or a photolithography process. In the transferring method, the graphene is transferred onto the lower clad layer 110 by contacting an adhesion tape to a graphite source. The optical transmission line 120 including the graphene may be formed of a 2-dimensional flat surface between the lower and upper clad layers 110 and 140. The optical transmission line 120 having 2-dimensional flat surface may have a simpler structure than the existing ridge type silicon waveguide. Thus, the optical modulator according to the embodiment of the inventive concept can improve productivity.

Figure 4A:
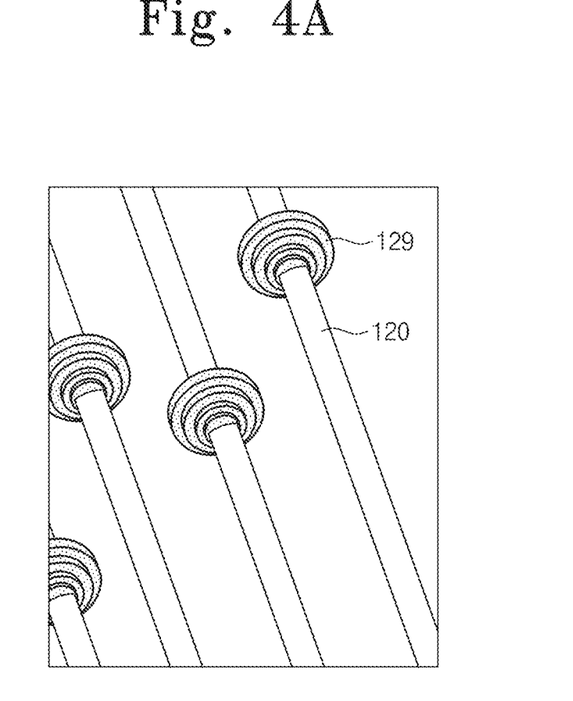
FIGS. 4A and 4B illustrate optical signal transmission states in the graphene waveguide 20 in FIG. 1.
Figure 4B:
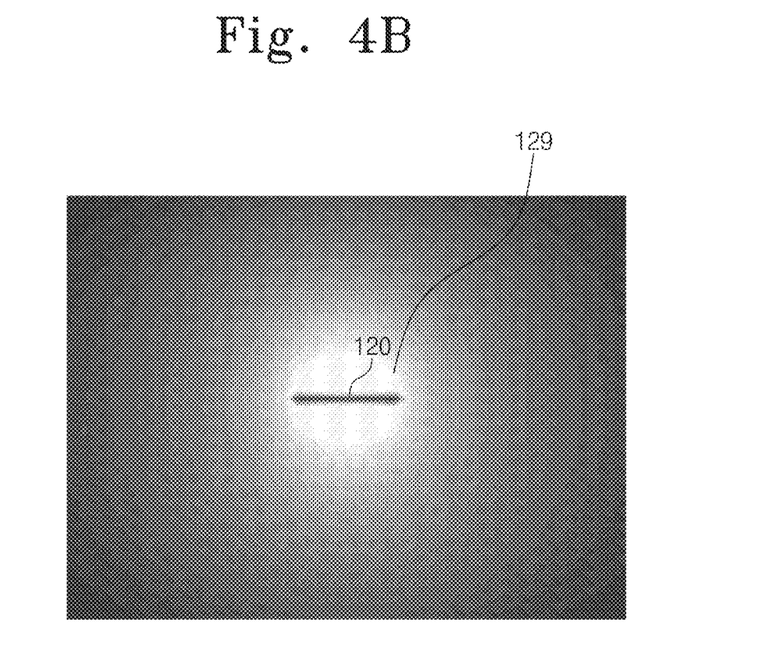

FIGS. 4A and 4B illustrate optical signal transmission states in the graphene waveguide 20 in FIG. 1.

Referring to FIGS. 1 to 4B, the optical signal may be transferred through free poles within the optical transmission line and their mutual coupling. A guide mode 129 formed by being excited in graphene-dielectric interfaces formed on and beneath the optical transmission line 120 is propagating along the optical transmission line 120 as shown in FIG. 4A. Here, the guide mode 129 may correspond to an optical signal. When a light is incident on the optical transmission line 120, an electronic surface wave called a surface plasmon polariton (SPP) wave may be generated on the optical transmission line 120. The SPP is formed by interaction of free electrons and an externally incident light and travels along an interface between a material having free electrons and a dielectric abutting on the material. That is, the SPP means an oscillatory wave of charge density traveling along a lower interface between the lower clad layer 110 and the optical transmission line 120 and an upper interface between the upper clad layer 150 and the optical transmission line 120. Among the surface plasmon polaritons, that used for long distance optical transmission is called a long-range surface plasmon polariton. The long-range plasmon polaritons are mutually combined to form the guide mode 129 around a metal line as shown in FIG. 4B.

Surface charge density oscillation may form a longitudinal surface bound wave. The longitudinal surface bound wave is a component that an electrical field component of an incident wave is perpendicular to an interface, and only a transverse magnetic (TM) mode thereof can excite and guide the long range surface plasmon polaritons. For example, an optical transmission line manufactured from metal may have about 5 nm to about 200 nm thickness, and about 2 μm to about 100 μm width.

Figure 5A:
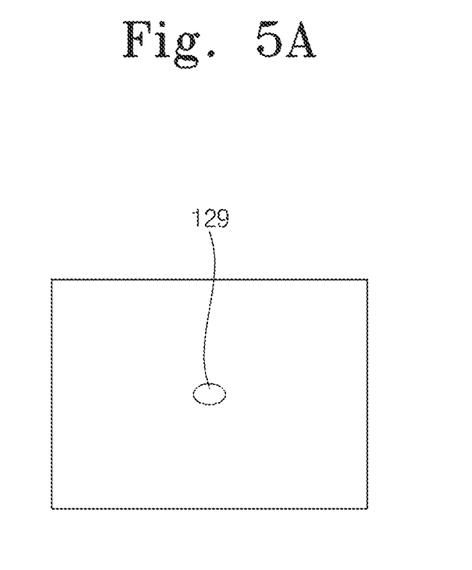
FIG. 5A illustrates a shape of a guide mode in an optical transmission line.

FIG. 5A illustrates a shape of the guide mode 129 in the graphene optical transmission line 120. Referring to FIG. 5A, when an optical signal is incident on the graphene optical transmission line 120, a circular guide mode 129 may be output around the graphene optical transmission line 120. The circular guide mode 129 may travel along the optical transmission line 120.

Figure 5B:
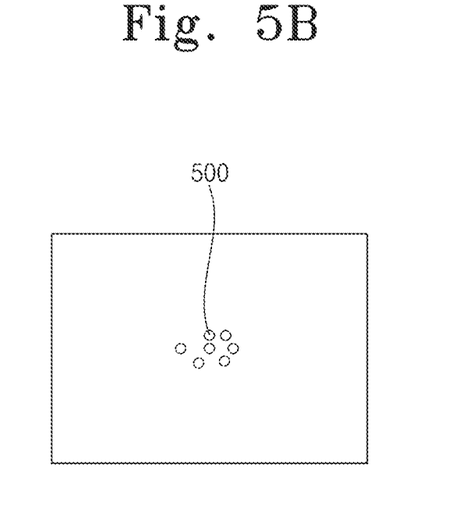
FIG. 5B illustrates a guide mode 500 dispersed by a current in pad regions of the optical transmission line.
Figure 6:
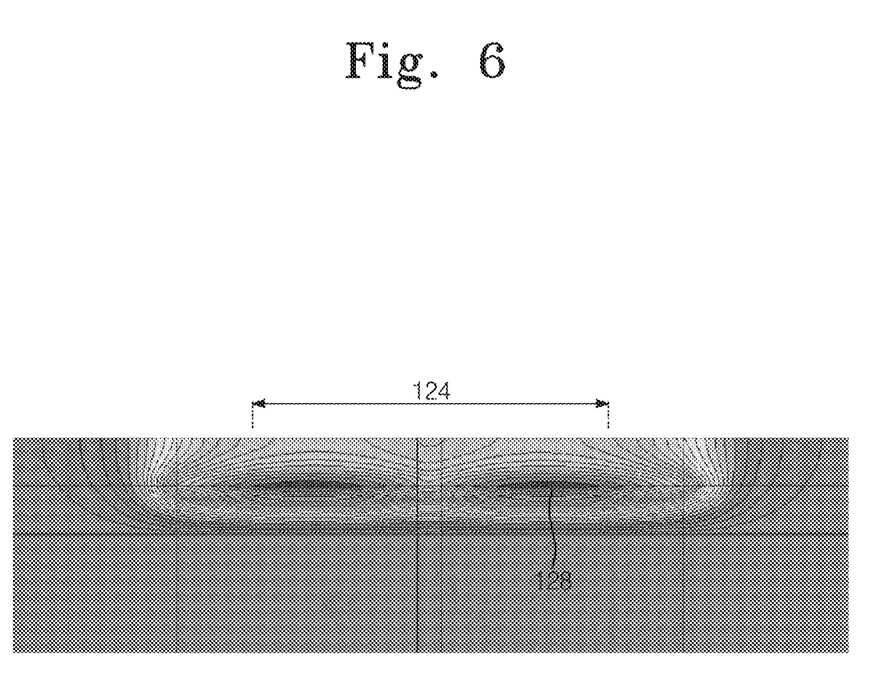
FIG. 6 illustrates a non-uniform refractive index distribution induced by heat generated in a modulation region which is formed of a guide region and the pad regions in FIG. 3.

FIG. 5B illustrates a guide mode 500 dispersed by a current to the pad regions 128 of the graphene optical transmission line 120. FIG. 6 illustrates a non-uniform refractive index distribution induced by heat generated in the modulation region 124 which is formed of the guide region 125 and the pad regions 128 in FIG. 3.

Referring FIGS. 5 and 6, when a current is applied to the pad regions 128, refractive index distributions of the lower and upper clad layers 110 and 140 become non-uniform as shown in FIG. 6 due to heat generation in the modulation region 124 which is formed of the guide region 125 and the pad regions 128. The circular guide mode 129 in FIG. 5A which is transmitted along the graphene optical transmission line 120 becomes the dispersed guide mode 500 in FIG. 5B due to the non-uniform refractive index distribution. The dispersed guide mode 500 may have a non-uniform shape. A change in the non-uniform shape of the guide mode 500 may result in a change of optical coupling efficiency in coupling to an optical fiber, thereby creating an optical modulation effect.

Figure 7:
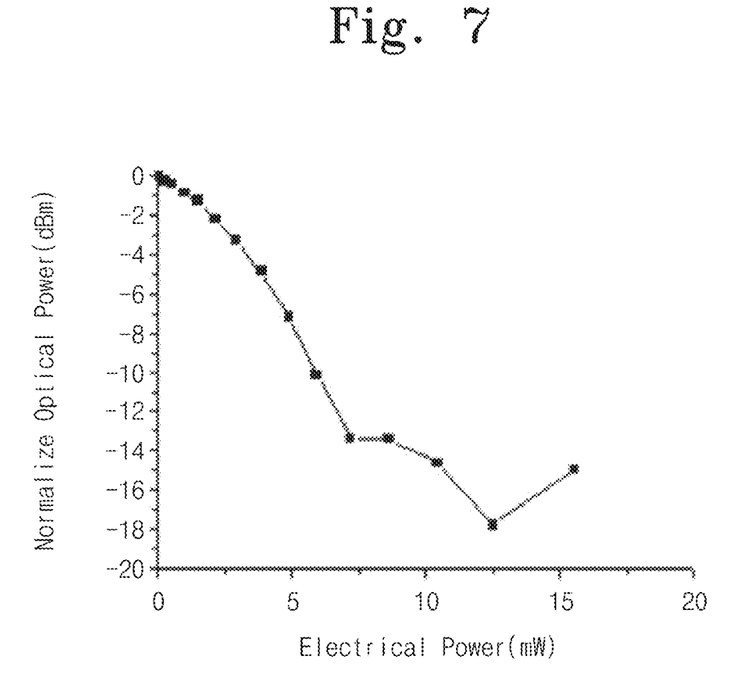
FIG. 7 is a graph illustrating output intensity of an output optical signal according to input power applied to pad electrodes.

FIG. 7 is a graph illustrating an output intensity of an output optical signal according to input power applied to the pad electrodes 130.

Referring to FIGS. 1 and 7, an optical output intensity of the optical transmission line 120 may be inversely proportional to input power of the modulation region 124. As the power applied to the pad electrodes 130 of the modulation region 124 increases, heat from the modulation region 124 may also increase. Refractive indexes of the lower and upper clad layers 110 and 140 may be changed by the heat from the modulation region 124. The heat from the modulation region 124, and the changes in the refractive indexes of the lower and upper clad layers 110 and 140 may be proportionally increased. An intensity of the output optical signal from the optical transmission line 120 may be decreased.

Figure 8:
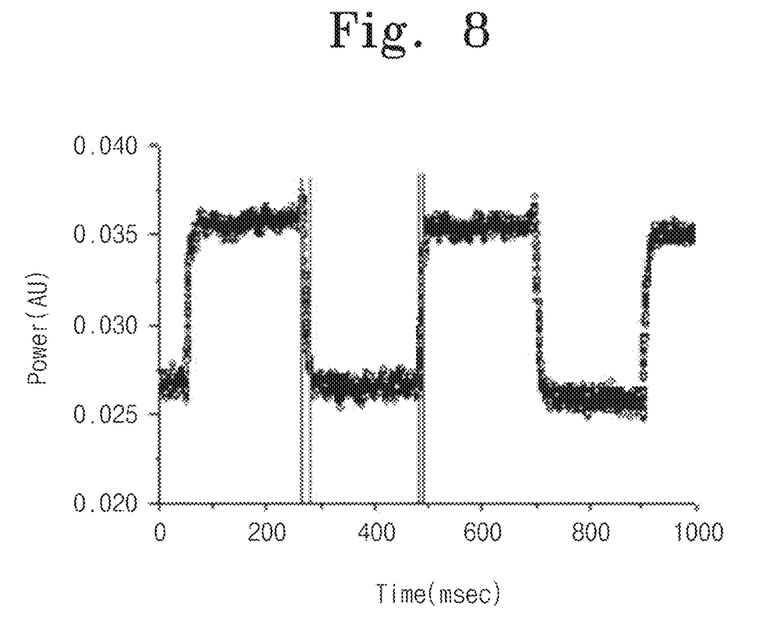
FIG. 8 is a graph illustrating intensity of an optical signal output from the optical transmission line, when pulse power is applied to the pad electrodes in the modulation region.

FIG. 8 is a graph illustrating the intensity of the optical signal output from the optical transmission line 120, when pulse power is provided to the pad electrodes 130 of the modulation region 124.

Referring FIGS. 1, 7, and 8, a pulse power signal may be provided to the modulation region 124. The pulsed power signal may have about 400 msec wavelength interval. The refractive index distributions of the lower and upper clad layers 110 and 140 may be periodically and non-uniformly distributed due to the pulsed power signal. The periodically and non-uniformly distributed refractive index distribution may periodically generate an optical signal traveling along the optical transmission line 120 in the dispersed guide mode 500. Accordingly, the optical modulator of the embodiment of the inventive concept can output an optical signal synchronized with an external pulse power signal.

Furthermore, the optical modulator 100 of an embodiment of the inventive concept may be fabricated to an optical module combined with a light source. Hereinafter, the optical module according to an embodiment of the inventive concept is described.

Figure 9:
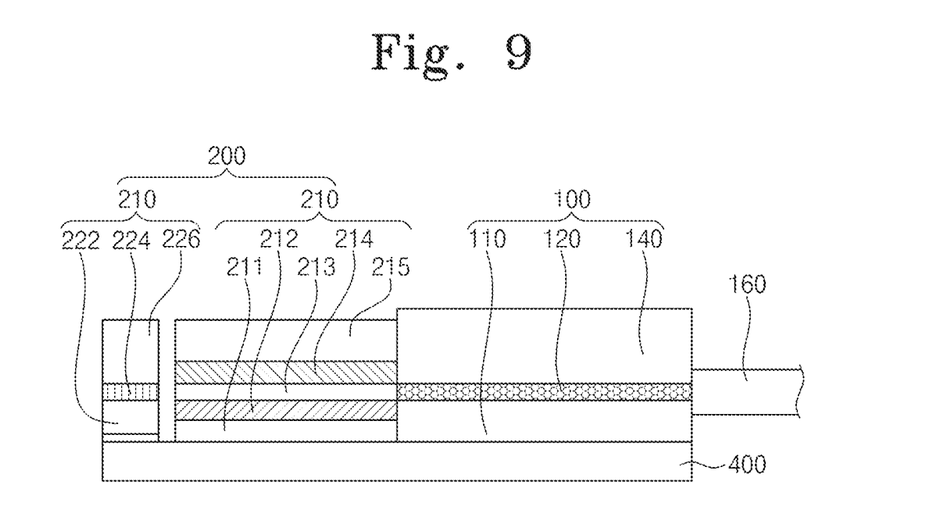
FIG. 9 is a cross-sectional view illustrating an optical module according to a first embodiment of the inventive concept.

FIG. 9 is a cross-sectional view illustrating an optical module according to a first embodiment of the inventive concept.

Referring to FIG. 9, the optical module may include a substrate 400, an external resonator laser 200, and an optical modulator 100. The substrate 400 may includes a silicon wafer or a printed circuit board (PCB). The external resonator laser 200 and the optical modulator 100 may be connected on the substrate 400. The external resonator laser 200 may be disposed on one side of the substrate 400. The optical modulator may be disposed on another side of the substrate 400. The external resonator laser 200 may provide an optical signal to the optical modulator 100. The optical modulator 100 may modulate the optical signal.

The external resonator laser 200 may include an oscillator 210 and a resonator 220. The oscillator 210 may generate a laser light. The resonator 220 may amplify the laser light. The laser light may be oscillated and resonated in a signal wavelength in the oscillator 210 and the resonator 220. The oscillator 210 may be disposed between the resonator 220 and the optical modulator 100. The oscillator 210 may include a buffer layer 211, a lower electrode layer 212, a semiconductor layer 213, an upper electrode layer 214, and a capping layer 215. The buffer layer 211 may be disposed on the substrate 400. The lower electrode layer 212 may be disposed on the buffer layer 211. The semiconductor layer 213 may be disposed on the lower electrode layer 212. The semiconductor layer 213 may include a group IV intrinsic semiconductor or a group III-V compound semiconductor. The intrinsic semiconductor may include silicon. The compound semiconductor may include gallium nitride, gallium arsenide, gallium aluminum arsenide, or gallium phosphide (GaP). The optical transmission line 120 of the optical modulator 100 may be connected to the semiconductor layer 214. The semiconductor layer 214 may be extended in the same direction as that of the optical transmission line 120. The upper electrode layer 214 may be disposed on the semiconductor layer 213. An external voltage may be applied to the lower and upper electrode layers 212 and 214. The capping layer 215 may be disposed on the upper electrode layer 214. The oscillator 210 and the resonator 220 may be separated on the substrate 400. The present invention is not limited hereto, and various changes are possible. For example, the oscillator 210 and the resonator 220 may be connected to each other. The resonator 220 may include a lower insulating layer 222, a grating layer 224, and an upper insulating layer 226. The lower insulating layer 222 may be disposed on the substrate 400. The buffer layer 211 and the lower electrode layer 212 may have the same height as that of the lower electrode layer 222. The grating layer 224 may be disposed on the lower insulating layer 222 and have the same direction and height as those of the semiconductor layer 213. The grating layer 224 may include gratings in the same interval as a wavelength spacing of the laser light in a vertical direction to the substrate 400. Also, the grating layer 224 may be formed from the same material as that of the semiconductor layer 213. The upper insulating layer 226 may be disposed on the grating layer 224. The semiconductor layer 213 and the grating layer 224 generate and provide a laser light to the optical transmission line 120 of the optical modulator 120.

Figure 10:
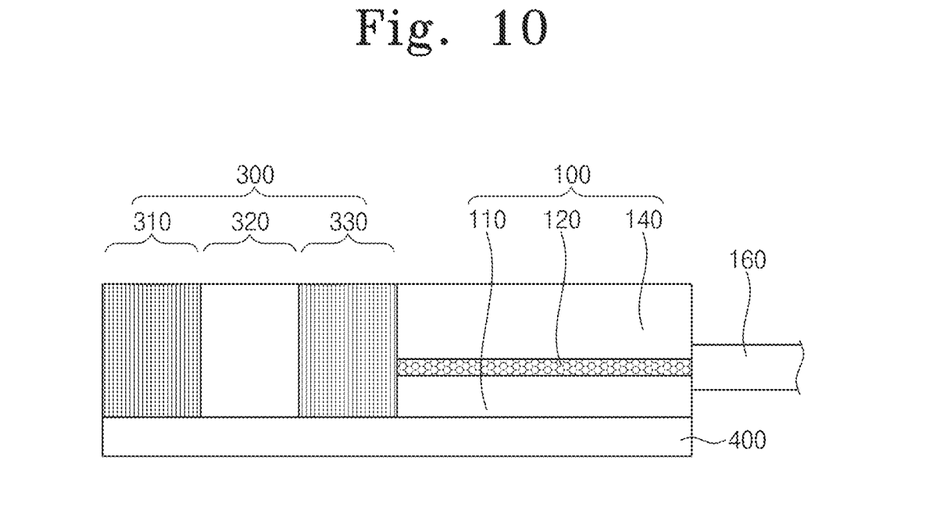
FIG. 10 is a cross-sectional view illustrating an optical module according to a second embodiment of the inventive concept.

FIG. 10 is a cross-sectional view illustrating an optical module according to a second embodiment of the inventive concept.

Referring to FIG. 10, the optical module of the embodiment may include a vertical-cavity surface-emitting laser (VCSEL) 300 disposed at another side of the optical modulator 100 on the substrate 400. In the second embodiment, the external resonator laser 200 of the first embodiment is replaced with the VCSEL 300. The external resonator laser 200 and the VCSEL 300 are light resources of the laser light. The VCSEL 300 may include lower mirror layers 310, an activation layer 320, and upper mirror layers 330. The upper mirror layers 330 may be connected to the optical modulator 100. The upper mirror layers 330 may have a first superlattice structure. The lower and upper mirror layers 310 and 330 may include respective superlattices of InAlAs/InAlGaAs and InGaAsP/InP, or InAlAs/InAlGaAs and InGaAsP/GaAsInP. The activation layer 320 may be disposed between the upper and lower mirror layers 330 and 310. The activation layer 320 may include a group III-V compound semiconductor of InAlAs/InAlGaAs, InGaAsP/InP, InAlGaAs/InAlGaAs, or InGaAsP/InGaAsP. The lower mirror layers 310 may have a second superlattice structure. The VCSEL 300 may provide the laser light to the optical modulator 100.

FIGS. 11 to 15 are cross-sectional views sequentially illustrating a method of manufacturing the optical modulator according to the first embodiment of the inventive concept on the basis of FIG. 1.

Figure 11:
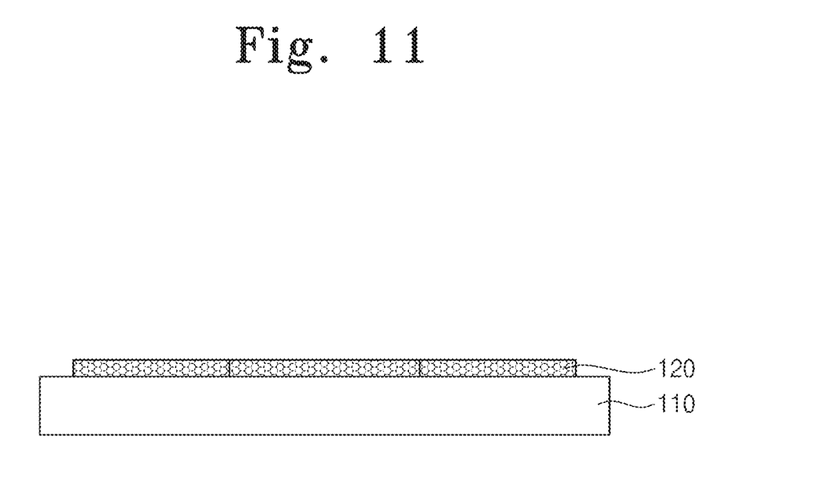
FIGS. 11 to 15 are process cross-sectional views sequentially illustrating a method of manufacturing the optical modulator according to the first embodiment of the inventive concept on the basis of FIG. 1.

Referring to FIG. 11, the optical transmission line 120 is formed on the lower clad layer 110. The optical transmission line 120 includes graphene. The graphene may be formed on an entire surface of the lower clad layer 110 in a chemical vapor deposition (CVD) method. The graphene may be patterned in a photolithography method. The present invention is not limited hereto. For example, the optical transmission line 120 may include graphene formed by a transferring method.

Figure 12:
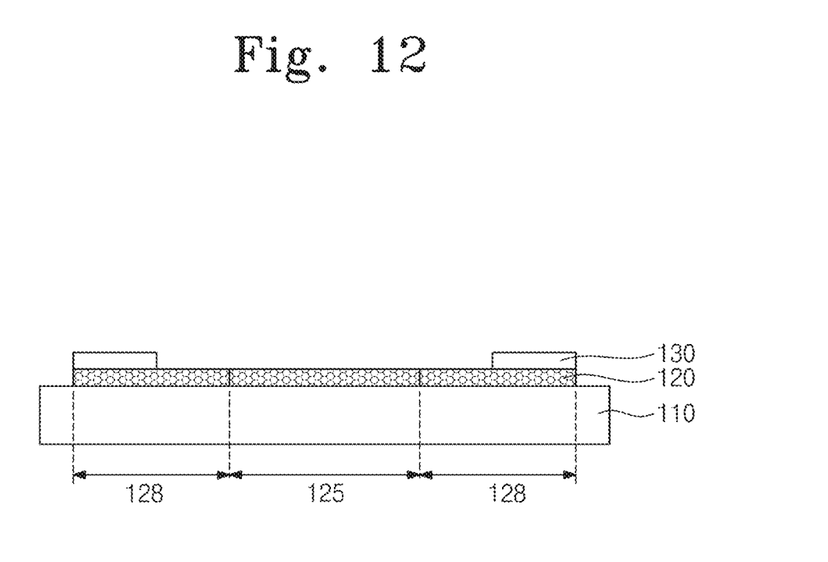

Referring FIG. 12, the pad electrodes 130 are formed on the pad regions 128 of the optical transmission line 120. The pad electrodes 130 may be formed in a lift-off process. The lift-off process includes a photolithography process forming a photoresist pattern which selectively exposes the pad regions 128, a deposition process forming a metal layer on the photoresist pattern and the pad regions 128, and a developing process removing the photoresist pattern and the metal layer on the photoresist pattern and forming the pattern electrodes 130 on the pad regions 128.

Figure 13:
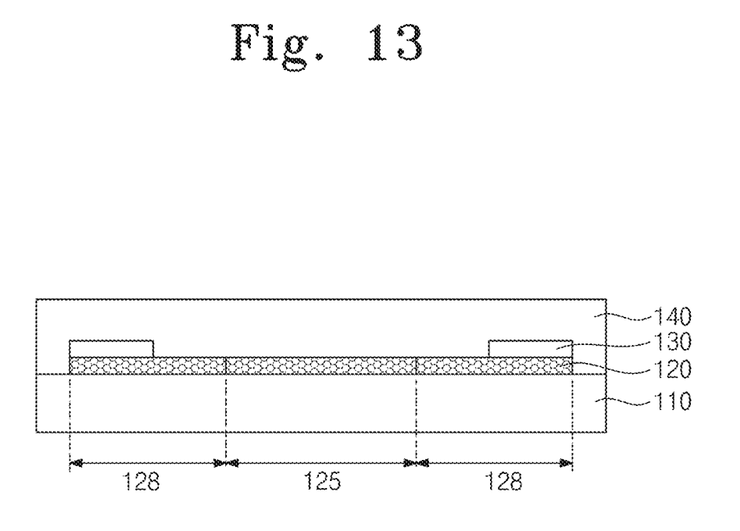

Referring to FIG. 13, the upper clad layer 140 is formed over the pad electrodes 130, the optical transmission line 120, and the lower clad layer 110. The upper clad layer 140 includes a silicon oxide film or a silicon nitride film formed in a CVD method.

Figure 14:
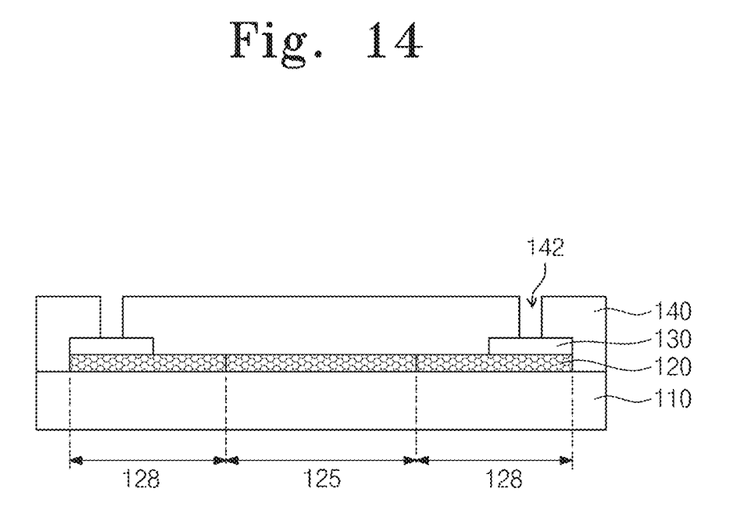

Referring to FIG. 14, contact holes 142 are formed by removing the upper lad layer 140 on the pad electrodes 130. The contact holes 142 may be formed in a photolithography process, and an etching process for the upper clad layer 140.

Figure 15:
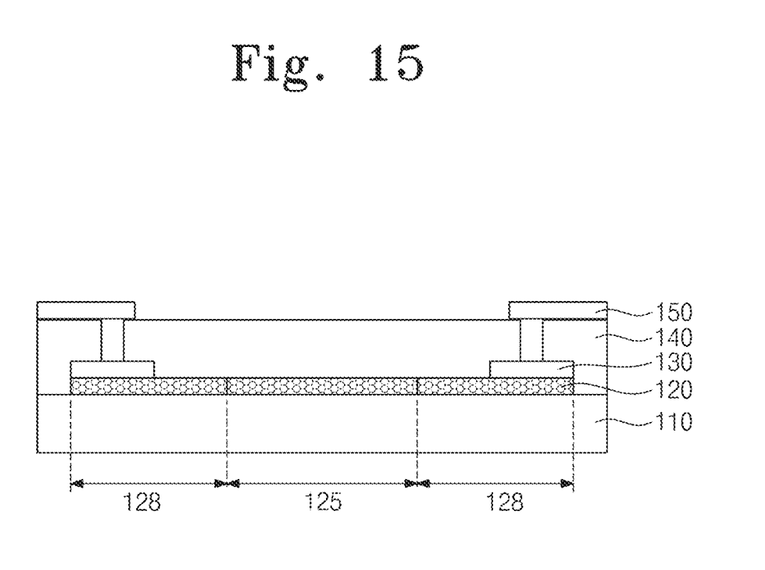

Referring to FIG. 15, the signal interconnections 150 are formed inside the contact holes 142 and on the upper clad layer 140. The signal interconnections 150 may be formed in a deposition process of a metal layer, a photolithography process, and an etching process for the metal layer. The signal interconnections 150 include contact plugs 152 of FIG. 3 in the contact holes 142.

An optical modulator according to an embodiment of the inventive concept may include a lower clad layer, an optical transmission line, an upper clad layer. The optical transmission line may be extended in one direction on the lower clad layer. The upper clad layer may cover the lower clad layer and the optical transmission line. The lower clad layer and the upper clad layer may include dielectrics. The optical transmission line may include graphene. The graphene may be transferred onto the lower clad layer in a transferring method which is simpler and cheaper than a photolithography method. The optical transmission line including graphene may be formed in a flat surface between the upper and lower clad layers. The optical transmission line including the flat surface may have a simpler structure than an existing 3-dimensional silicon waveguide.

Accordingly, the optical modulator and the optical module including the same according to the embodiment of the inventive concept may improve productivity.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An optical modulator comprising:
a lower clad layer;
an optical transmission line extending in a first direction on the lower clad layer; and
an upper clad layer on the optical transmission line and the lower clad layer,
wherein the optical transmission line comprises graphene,
wherein the optical transmission line comprises an input region, a modulation region, and an output region with respect to the first direction,
wherein the modulation region of the optical transmission line is interposed between the input region and the output region, and extended wider than the input and output regions in a second direction crossing the first direction.

2. The optical modulator of claim 1, wherein the modulation region comprises:
a guide region disposed between the input and output regions and having the same linewidth as those of the input and output regions; and
a pad region connected to both sides of the guide region in the second direction.

3. The optical modulator of claim 2, further comprising pad electrodes connected to top portions or bottom portions of the pad regions.

4. The optical modulator of claim 3, further comprising signal interconnections connected to the pad electrodes.

5. The optical modulator of claim 4, wherein the signal interconnections comprises:
an interconnection layer disposed on the upper clad layer or beneath the lower clad layer; and
a contact layer penetrating through the upper or lower clad layer, and connected to the upper clad layer and the pad electrodes, or the lower clad layer and the pad electrodes.

6. The optical modulator of claim 1, further comprising optical fibers connected to the optical transmission line of the input and output regions.

* * * * *